United States Patent [19]

Iwai et al.

[11] Patent Number: 6,108,051
[45] Date of Patent: Aug. 22, 2000

[54] MOLDED PART FOR AN IR TELEVISION REMOTE CONTROL SYSTEM

[75] Inventors: Yuji Iwai, Kanagawa; Hideyuki Taguchi; Satoshi Nozuyama, both of Tokyo, all of Japan

[73] Assignee: Sony Corporation, Tokyo, Japan

[21] Appl. No.: 08/998,062

[22] Filed: Dec. 24, 1997

[30] Foreign Application Priority Data

Jan. 7, 1997 [JP] Japan ..................................... 9-000825

[51] Int. Cl.$^7$ ...................................................... H04N 5/44
[52] U.S. Cl. ............................................................ 348/734
[58] Field of Search ..................................... 395/142–148; 348/734, 211; 341/176; 396/56; D14/218

[56] References Cited

U.S. PATENT DOCUMENTS 4,941,036   7/1990   Itoh .......................................... 348/734

*Primary Examiner*—Nathan Flynn
*Attorney, Agent, or Firm*—Jay H. Maioli

[57] ABSTRACT

A molded part for use in electronic devices using an infrared remote control where the molded part is molded using an infrared transmissive material and an infrared blocking coating is applied thereon. A predetermined pattern of slits or dots is formed on the infrared blocking coating for permitting the transmission and reception of infrared signals.

6 Claims, 6 Drawing Sheets

MOLDED PART FOR AN IR TELEVISION REMOTE CONTROL SYSTEM

BACKGROUND OF THE INVENTION

The present invention relates to a molded part suitable for use in a device for conducting remote control by using infrared rays, for example.

In a television receiver, for example, remote control of power on/off, channel up/down, and tone volume increase/decrease using infrared rays or the like is carried out. In that case, a receiving unit of a remote control signal (infrared rays) is disposed, for example, in a so-called bezel portion or the like of an outer frame of a display face. As a result, the user can operate the remote control with extreme smoothness by simply directing a commander to the display face and operating the commander.

FIG. 1 shows an appearance of, for example, a television receiver. With reference to FIG. 1, a control panel 50 incorporating the above described remote control signal (infrared rays) receiving unit and control means for manually controlling the power on/off, channel up/down, and tone volume increase/decrease or the like as one body is provided on the so-called bezel portion or the like of the outer frame of the display face. This control panel 50 is formed by a molded part as shown in FIG. 2, for example.

As shown in FIG. 2, this control panel 50 includes a receiving window 51 for receiving the above described remote control signal (infrared rays), a group of switches such as a power on/off switch 52, a channel up/down switch 53, a volume increase/decrease switch 54, an input selection switch 55 and an input setting switch 56 or the like, and a group of indicators such as a power on indicator 57 and an indicator 58 indicating input setting or the like. In addition, statements 59 indicating contents of such control/setting switches are also included.

Inside the receiving window 51 for the above described remote control signal (infrared rays) a receiving means (phototransistor) 60 for receiving the remote control signal (infrared rays), a receiving circuit board 61 for the remote control signal and so on are provided as shown in FIG. 3. The above described switch group and the indicator group are provided by, for example, fitting. The above described statements 59 indicating contents of control/setting are formed together with application or deposition of an arbitrary pigment onto the above described surface.

In other words, the receiving unit of the above described remote control signal is provided within a molded part installed, for example, on the surface of the device. In that case, this molded part is molded by, for example, an injection molding. An arbitrary pigment is coated or melt-deposited on its surface. In the case of coating the pigment, an arbitrary pigment is coated on the surface of a member molded beforehand. In the case of melt-depositing the pigment deposition, an arbitrary pigment coated, for example, on an arbitrary film, is melt-deposited on the surface of the molded member simultaneously at the time of its injection molding.

In the case where the receiving unit of the remote control signal is disposed, for example, in the so-called bezel portion or the like of the outer frame of the display face, it was found that such receiving unit was unsightly and tended to be disliked. Heretofore, therefore, a portion such as the bezel portion or the like housing the receiving unit is formed by using a material (such as resin or the like) capable of transmitting infrared rays therethrough, for example, and a pigment capable of transmitting infrared rays therethrough is coated or melt-deposited on the surface of the material. By this arrangement, the receiving unit can be made completely invisible to all appearances.

However, use of this method limits pigments capable of being coated or melt-deposited on the surface. In other words, pigments capable of transmitting infrared rays therethrough typically have dark colors. Pigments having bright colors or metal luster typically cannot transmit infrared rays therethrough. In the above described method, therefore, pigments to be coated or melt-deposited on the surface are limited to, for example, dark colors. It places great restrictions at the time of, for example, device design.

Alternatively, it may also be conceivable to coat or melt-deposit a pigment capable of transmitting infrared rays onto only a portion corresponding to the above-described receiving unit. In the case of, for example, coating a pigment, however, because a pigment different from that of other portions must be applied, the number of processes is increased by the process to coat this pigment. Also, in the case where a pigment is melt-deposited on a part at the same time that the part is molded by the injection molding, the number of processes is increased because of printing for providing an arbitrary pigment on the above described film in order to deposit a pigment different from that of other portions.

In the above described case where a pigment is melt-deposited on a part simultaneously with injection molding of the part, a film 81 is prepared, for example, as shown in FIG. 4. On this film 81, an arbitrary pigment 82 forming the entire surface of the molded part, characters 83 using a green pigment to represent a statement 59 of, for example, "POWER" and characters 84 using a white pigment to represent other statements 59 are formed by printing or the like. Furthermore, a pigment 85 capable of transmitting infrared rays therethrough is printed on a portion of the film 81 corresponding to the above described receiving window 51.

By gripping this film 81 between metal molds 86 and 87 for molding the part and injecting resin or the like through an injection hole 88, the part is molded, and simultaneously the above described arbitrary pigments 82 and 85, and the characters 83 and 84 using the green and white pigments are melt-deposited on the surface of the part. In the case where this method is used and the pigment 82 forming the entire surface of the part does not transmit infrared rays, therefore, an extra printing process is needed in order to form the pigment 85 capable of transmitting infrared rays on the portion corresponding to the receiving window 51.

Furthermore, even in the case where a pigment capable of transmitting infrared rays therethrough is coated or melt-deposited on the receiving window alone, it is necessary to make the color of the pigment coated or melt-deposited on other portions akin to that of the pigment coated or melt-deposited on the receiving window in order to make the color of the pigment coated or melt-deposited on the receiving window as compared with other portions. In this case as well, therefore, pigments which can be coated or melt-deposited on other portions are limited to, for example, dark colors, and consequently great restrictions are placed at the time of, for example, device design.

Unlike these methods, it is also conducted to contrive the design of the entire device so as to make the receiving unit inconspicuous. According to this method, however, such contrivance in design for making the receiving unit inconspicuous places great restrictions in designing the device. In addition, there is a growing tendency to simplify the device design in recent years. It thus becomes difficult to contrive the design so as to make the receiving unit inconspicuous.

SUMMARY OF THE INVENTION

In view of these points, the present invention has been made. The problem to be solved can be summarized as follows. In making, for example, a receiving unit of a remote control signal inconspicuous, pigments which can be coated or melt-deposited on the surface of a device are limited and consequently great restrictions are placed when designing the device.

In accordance with the present invention, therefore, a pigment coated or melt-deposited on the surface of a portion for sending or receiving a remote control signal is provided with a predetermined pattern. As a result, the remote control signal can be transmitted or received through this predetermined pattern of the pigment.

In accordance with the present invention, in a molded part formed by molding a material capable of transmitting a remote control signal therethrough, and having an arbitrary pigment coated or melt-deposited on a surface thereof, a predetermined pattern is formed in a pigment coated or melt-deposited on a portion of a surface of the molded part housing inside thereof a means for transmitting or receiving a remote control signal, and the remote control signal is transmitted through the predetermined pattern of the pigment to conduct a transmitting or receiving operation for the remote control signal.

In making, for example, a receiving unit of a remote control signal inconspicuous, pigments which can be coated or melt-deposited on the surface of a device are limited when the conventional method is used, and consequently great restrictions are placed when designing the device. According to the present invention, however, the receiving unit can be easily made inconspicuous without hampering the transmitting or receiving characteristics, by printing a predetermined pattern with the same pigment.

Since the receiving unit is inconspicuous, restrictions placed by providing the receiving unit are removed and the degree of freedom on the device design is largely increased. As for the pigment coated or melt-deposited on the surface, an arbitrary pigment can be used regardless of whether or not it permits the transmission of infrared rays therethrough. The restriction placed on the color or the like of the surface is removed. Thus, a desired pigment having metal luster or the like can be used.

In the case where a control panel, for example, is molded by the injection molding and a pigment is melt-deposited on the surface of the control panel, the present invention makes it possible to print a predetermined pattern on, for example, an arbitrary film at a time and reduce the number of the printing processes.

DESCRIPTION OF THE PREFERRED EMBODIMENTS

Figure 5:
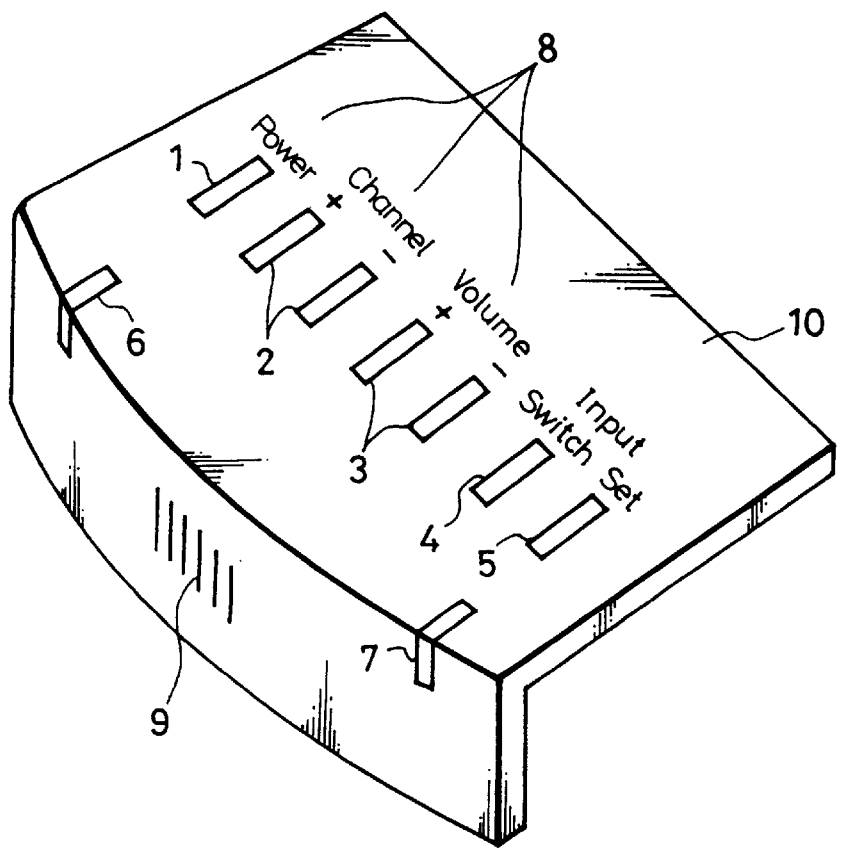
FIG. 5 is a perspective view showing an arrangement of an example of a molded part to which the present invention is applied.
Figure 6:
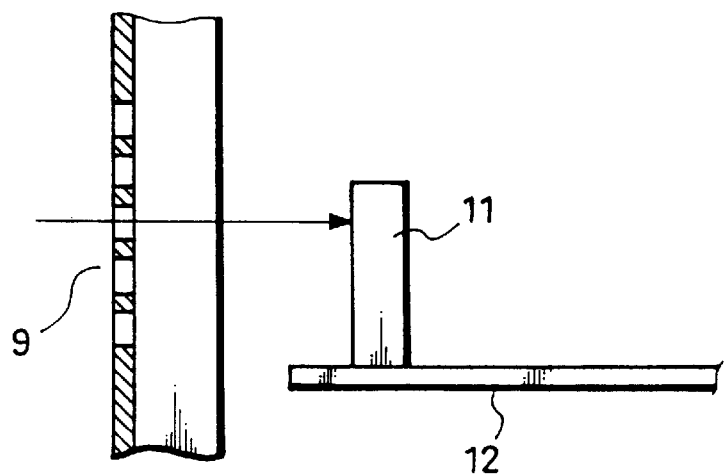
FIG. 6 is a diagram used to explain the operation of the molded part shown in FIG. 5.

Hereafter, the present invention will be described with reference to the drawings. FIG. 5 shows the configuration of an example of a control panel 10 provided, for example, on the above described so-called bezel portion or the like of the outer frame of the display face.

Figure 1:
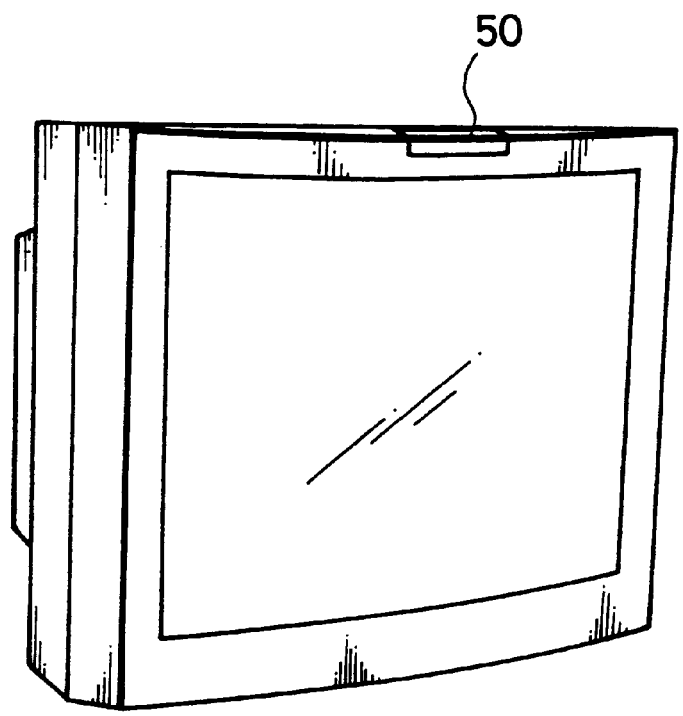
FIG. 1 is a perspective view used to explain a television receiver.
Figure 2:
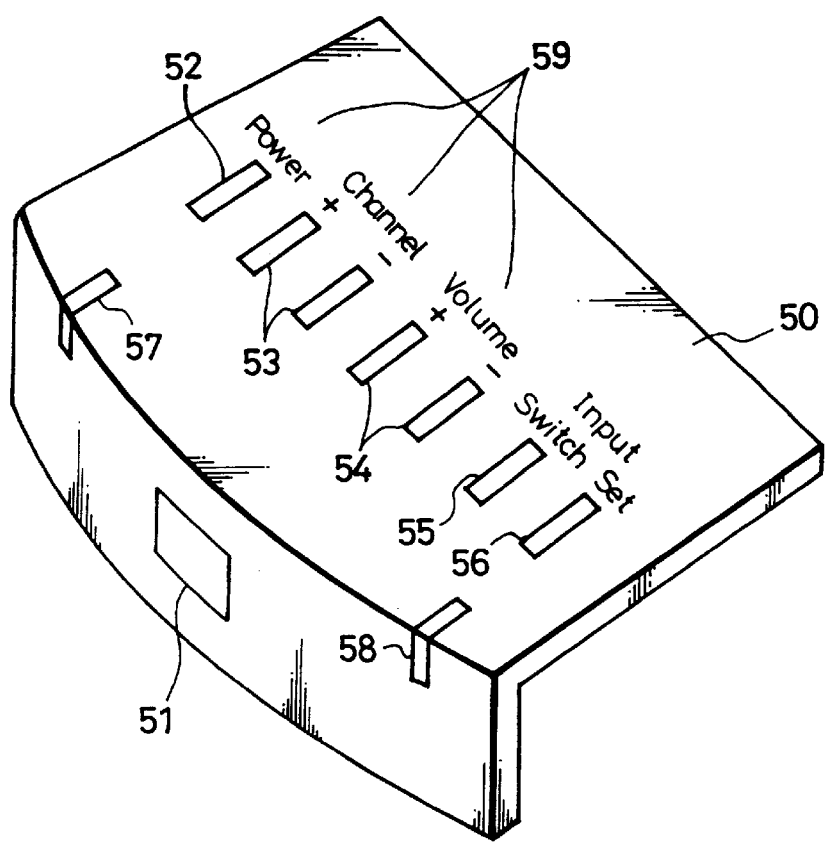
FIG. 2 is a perspective view showing an arrangement of a conventional molded part.
Figure 3:
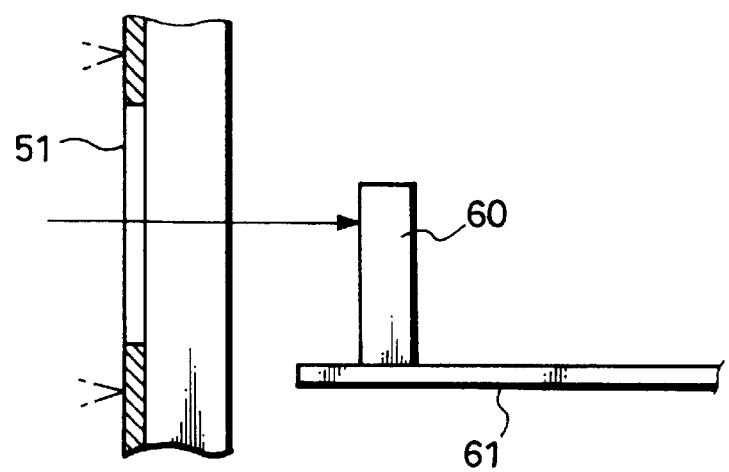
FIG. 3 is a diagram used to explain the operation of the conventional molded part.
Figure 4:
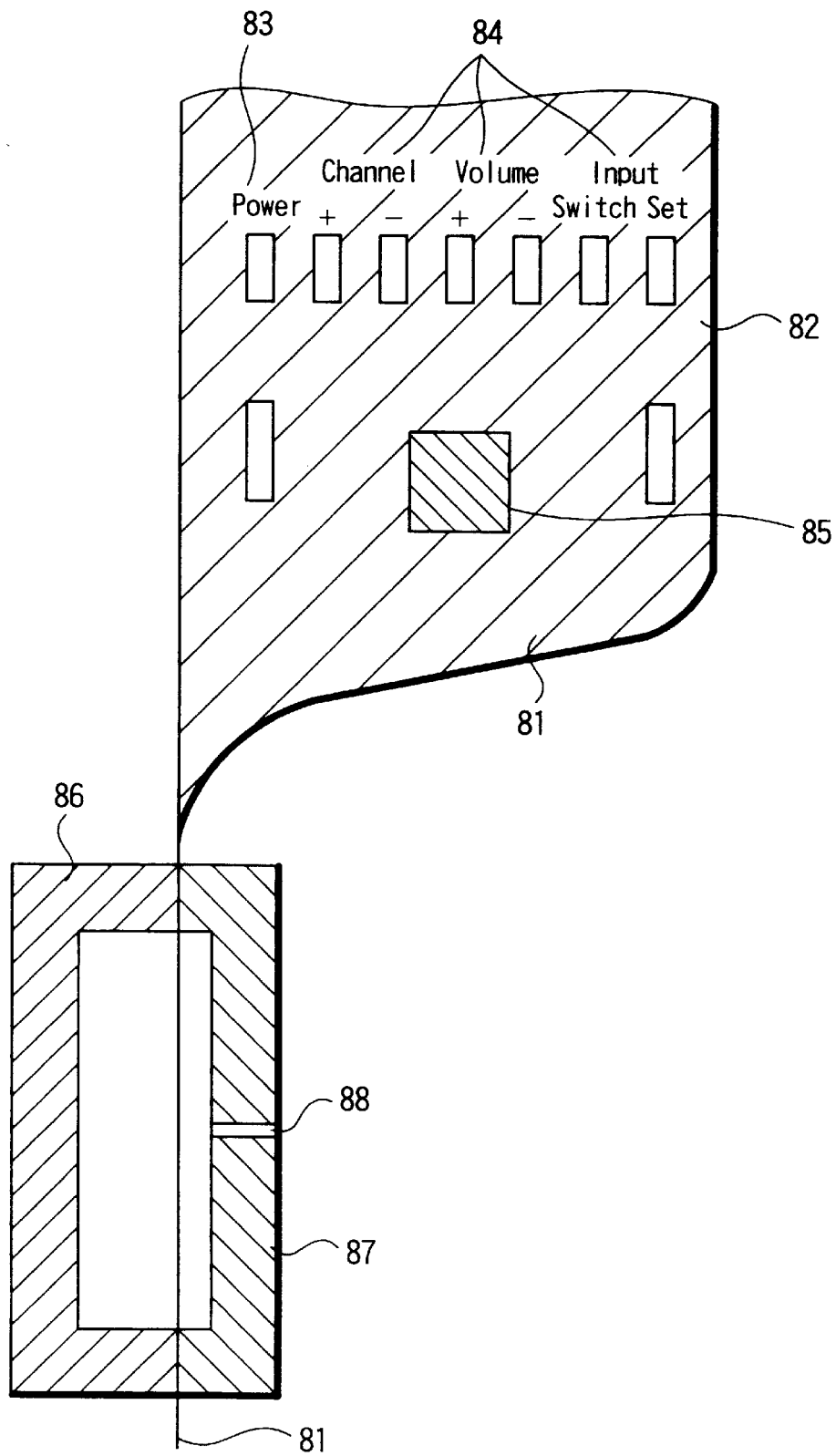
FIG. 4 is a diagram used to explain the molding process of the conventional molded part.

Referring to FIG. 5, the control panel 10 includes a group of switches such as a power on/off switch 1, a channel up/down switch 2, a volume increase/decrease switch 3, an input selection switch 4 and an input setting switch 5 or the like, and a group of indicators such as a power on indicator 6 and an indicator an 7 indicating input setting or the like, in the same way as FIG. 2. In addition, statements 8 indicating contents of such control/setting switches are also inscribed.

In the control panel 10, a pattern 9 having, for example, predetermined slits is formed on a pigment at a position of the surface corresponding to the receiving window 51 of FIG. 2. In the portion of the predetermined pattern 9, therefore, a remote control signal (infrared rays) is transmitted between the slits and irradiated onto a receiving means (a phototransistor) 11. Furthermore, the signal applied to the phototransistor 11 is taken out via a receiving circuit board 12 and so on.

If, in this device, the control panel 10, for example, is to be molded by the injection molding and a pigment is to be melt-deposited on the surface of the control panel 10, an arbitrary pigment formed on, for example, an arbitrary film by printing or the like is melt-deposited on the surface of the molded part simultaneously with the injection molding.

Figure 7:
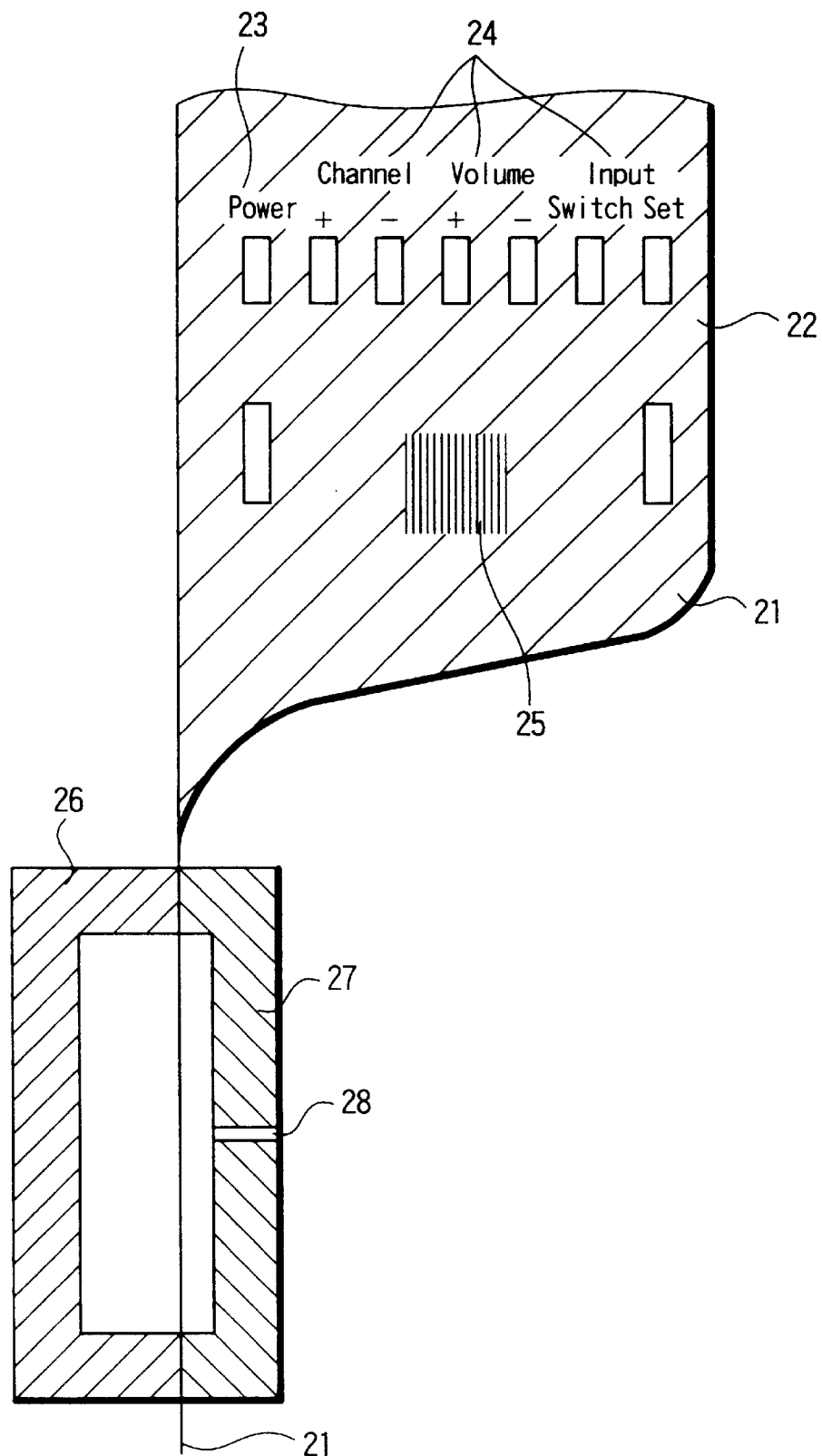
FIG. 7 is a diagram used to explain the molding process of the molded part shown in FIG. 5.

In this device, an arbitrary pigment 22 forming the entire surface of the molded part, characters 23 using a green pigment to represent a statement 8 of, for example, "POWER" and characters 24 using a white pigment to represent other statements 8 are formed on an arbitrary film 21 by printing or the like, as shown in FIG. 7. Furthermore, on a portion corresponding to the above described predetermined pattern 9, vertical slits 25 as illustrated, for example, are printed by using the same pigment 22 forming the entire surface.

By gripping the film 21 between metal molds 26 and 27 for molding a part and injecting resin or the like through an injection hole 28, the part is molded, and simultaneously the above described arbitrary pigments 22 and the characters 23 and 24 using the green and white pigments are melt-deposited on the surface of the molded part. Even in the case where the pigment 22 forming the entire surface of the part does not transmit infrared rays therethrough, it becomes possible by using this method to print the vertical slits 25 with the same pigment 22 and print the predetermined pattern 9 in one printing process.

In this device, therefore, since the pigment coated or melt-deposited on the surface of the portion for transmitting or receiving the remote control signal is provided with the predetermined pattern, the remote control signal can be transmitted through the predetermined pattern of the pigment, and therefore the remote control signal can be transmitted or received.

In making, for example, the receiving unit of a remote control signal inconspicuous, pigments which can be coated or melt-deposited on the surface of a device are limited when the conventional method is used, and consequently great restrictions are placed when designing the device. According to the present invention, however, the receiving unit can be easily made inconspicuous without hampering the transmitting or receiving characteristics, by printing the predetermined pattern with the same pigment.

In other words, since the receiving unit is inconspicuous, restrictions caused by providing the receiving unit are removed and the degree of freedom on the device design is largely increased. As for the pigment coated or melt-deposited on the surface, an arbitrary pigment can be used regardless of whether the pigment permits transmission of infrared rays. The restriction placed on the color or the like of the surface is removed. Thus, a desired pigment having metal luster or the like can be used.

In the case where a control panel, for example, is molded by the injection molding and a pigment is deposited on the surface of the control panel, it is possible to print a predetermined pattern on, for example, an arbitrary film at one time and reduce the number of the printing processes.

If in the above described device the surface processing of the control panel 10 is conducted by coating a pigment thereon instead of the melt-deposition of the pigment, the above described predetermined pattern 9 can be formed depending upon the skill at the time of coating. In this case as well, an effect similar to that of the above melt-described case of deposition is obtained.

Figure 8A:
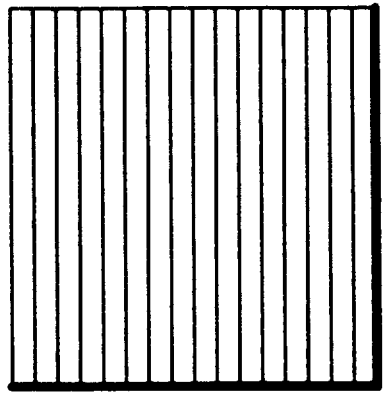
FIGS. 8A and 8B are diagrams used to explain the molded part according to the present invention.
Figure 8B:
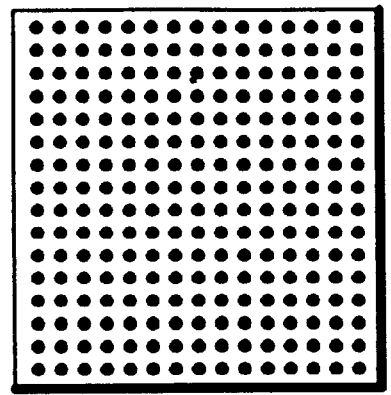

In the above described device, the predetermined pattern 9 is not limited to the above described slit pattern (see FIG. 8A), but may be formed by a dot pattern as shown in FIG. 8B. In the case of a vertical slit pattern, for example, however, it becomes inconspicuous especially when it is used in a device formed on a cylindrical face.

Furthermore, in these devices, it was confirmed by experiments that transmitting and receiving operation could be sufficiently conducted by using the output of a commander of existing remote control devices provided that the light transmission factor of the above described slit pattern or dot pattern was about 50% or greater.

Furthermore, the above described predetermined slit pattern or dot pattern may be formed not only at the position corresponding to the above described receiving window but also, for example, over the entire surface of the device.

Thus, in the above described molded part formed by molding a material capable of transmitting a remote control signal, and having an arbitrary pigment coated or melt-deposited on a surface thereof, when a predetermined pattern is formed in a pigment coated or melt-deposited on a portion of a surface of the molded part housing inside thereof a means for transmitting or receiving a remote control signal, it becomes possible to easily make the receiving unit inconspicuous without hampering the transmitting or receiving characteristics, thereby it becomes possible to increase the degree of freedom in device design and pigment selection.

The above described device can be adopted not only in the receiving unit of a remote control device of the above described television receiver, but also in a transmitting unit for a remote control signal of a commander in a remote control device, a receiving unit of a wireless head phone using infrared rays, and a transmitting unit or a receiving unit of other devices having an optical sensor for the infrared rays, or ultraviolet rays and so on.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A molded part molded by using a material capable of transmitting a remote control signal therethrough, and having an arbitrary pigment coated or melt-deposited on a surface thereof, wherein means for transmitting or receiving a remote control signal are placed behind said molded part, said molded part comprising:

a predetermined pattern formed on said arbitrary pigment coated or melt-deposited on a portion of said surface opposite said means for transmitting or receiving a remote control signal, wherein said remote control signal is transmitted through said predetermined pattern of said arbitrary pigment to conduct a transmitting or receiving operation, wherein said molded part is molded by an injection molding process, and when said arbitrary pigment is melt-deposited on said surface simultaneously with said injection molding process said predetermined pattern is formed in said pigment melt-deposited on said portion of said surface.

2. A molded part molded by using a material capable of transmitting a remote control signal therethrough, and having an arbitrary pigment coated or melt-deposited on a surface thereof, wherein means for transmitting or receiving a remote control signal are placed behind said molded part, said molded part comprising:

a predetermined pattern formed on said arbitrary pigment coated or melt-deposited on a portion of said surface opposite said means for transmitting or receiving a remote control signal, wherein said remote control signal is transmitted through said predetermined pattern of said arbitrary pigment to conduct a transmitting or receiving operation, wherein said predetermined pattern includes a slit pattern.

3. A molded part molded by using a material capable of transmitting a remote control signal therethrough, and having an arbitrary pigment coated or melt-deposited on a surface thereof, wherein means for transmitting or receiving a remote control signal are placed behind said molded part, said molded part comprising:

a predetermined pattern formed on said arbitrary pigment coated or melt-deposited on a portion of said surface opposite said means for transmitting or receiving a remote control signal, wherein said remote control signal is transmitted through said predetermined pattern of said arbitrary pigment to conduct a transmitting or receiving operation, wherein said predetermined pattern includes a dot pattern.

4. A molded part molded by using a material capable of transmitting a remote control signal therethrough, and hav ing an arbitrary pigment coated or melt-deposited on a surface thereof, wherein means for transmitting or receiving a remote control signal are placed behind said molded part, said molded part comprising:

a predetermined pattern formed on said arbitrary pigment coated or melt-deposited on a portion of said surface opposite said means for transmitting or receiving a remote control signal, wherein said remote control signal is transmitted through said predetermined pattern of said arbitrary pigment to conduct a transmitting or receiving operation, wherein said arbitrary pigment is an infrared blocking pigment and wherein said predetermined pattern has an infrared transmission factor of greater or equal to 50%.

5. The molded part according to claim 1, wherein said material capable of transmitting a remote control signal includes a resin.

6. The molded part according to claim 1, wherein said predetermined pattern is formed on an entire surface of said molded part.

* * * * *